US012678750B2

(12) United States Patent
Millar et al.

(10) Patent No.: US 12,678,750 B2
(45) Date of Patent: Jul. 14, 2026

(54) MEASURE TO IMPROVE LIQUID-GAS EDUCTOR PERFORMANCE

(71) Applicants: Dean Lee Millar, Sudbury (CA); Julius S Vrana, Baden, PA (US); William W Timmons, Surprise, AZ (US)

(72) Inventors: Dean Lee Millar, Sudbury (CA); Julius S Vrana, Baden, PA (US); William W Timmons, Surprise, AZ (US)

( * ) Notice: Subject to any disclaimer, the term of this patent is extended or adjusted under 35 U.S.C. 154(b) by 99 days.

(21) Appl. No.: 18/505,403

(22) Filed: Nov. 9, 2023

(65) Prior Publication Data

US 2024/0189785 A1 Jun. 13, 2024

Related U.S. Application Data

(60) Provisional application No. 63/425,159, filed on Nov. 14, 2022.

(51) Int. Cl.
*B01F 25/312* (2022.01)
*B01F 23/2326* (2022.01)

(52) U.S. Cl.
CPC .... *B01F 25/31243* (2022.01); *B01F 23/2326* (2022.01)

(58) Field of Classification Search
CPC ....... Y10T 137/2526; Y10T 137/86075; B01F 25/31243; B01F 23/2326; B01F 25/31242
See application file for complete search history.

(56) References Cited

U.S. PATENT DOCUMENTS

| | | |
|---|---|---|
| 543,410 A | 7/1895 | Taylor |
| 2,478,051 A | 8/1949 | Nordell |

(Continued)

FOREIGN PATENT DOCUMENTS

| | | | | |
|---|---|---|---|---|
| DE | 102004030747 A1 * | 1/2006 | .............. | B01F 3/026 |
| WO | WO-8910184 A1 * | 11/1989 | ........ | B01F 25/31242 |
| WO | WO-2022126019 A2 * | 6/2022 | .............. | C10J 3/466 |

OTHER PUBLICATIONS

Bhat et al., "Momentum transfer in a horizontal liquid-jet ejector", The Canadian Journal of Chemical Engineering, vol. 50, No. 3, Jun. 1972, pp. 313-317.

(Continued)

*Primary Examiner* — Jessica Cahill

(57) ABSTRACT

A method to improve a performance and efficiency of a liquid-gas eductor includes injecting a small amount of secondary gas into the primary motive liquid prior to the latter's arrival at the eductor. This measure simultaneously reduces the flow rate of motive fluid and maintains a level of secondary inducted flow such that the aggregate secondary flow is higher than without the intervention—for certain conditions. The additional work needed in introducing the injected secondary fluid, by auxiliary means, is a few percentage points of the work done by the motive fluid without the intervention. The quantity of secondary fluid inducted and injected by the eductor adopting the above measures approaches double than that of the secondary flow without the measure. The motive liquid volumetric flow rate is reduced slightly which with the enhanced aggregate secondary flow means that the energy efficiency of the eductor process is substantially increased.

6 Claims, 5 Drawing Sheets

(56) References Cited

U.S. PATENT DOCUMENTS

| | | | | | |
|---|---|---|---|---|---|
| 2,707,480 | A * | 5/1955 | Klosse | G05D 11/006 137/487 |
| 4,186,772 | A * | 2/1980 | Handleman | F04F 5/466 137/893 |
| 4,207,180 | A * | 6/1980 | Chang | C02F 3/1294 261/36.1 |
| 4,764,058 | A * | 8/1988 | Jones | F04F 5/467 112/282 |
| 5,099,648 | A | 3/1992 | Angle | |
| 7,377,492 | B2 | 5/2008 | Vrana et al. | |
| 8,579,596 | B2 * | 11/2013 | Huntley | F04C 19/00 417/151 |
| 2002/0166593 | A1 * | 11/2002 | Oliver | B01F 35/718 137/893 |
| 2008/0105315 | A1 * | 5/2008 | Botros | F04F 5/467 137/814 |
| 2010/0108167 | A1 * | 5/2010 | Kidd | F04F 5/465 137/815 |
| 2010/0149906 | A1 * | 6/2010 | Burns, II | B01F 25/211 366/163.2 |
| 2012/0057427 | A1 * | 3/2012 | Torkildsen | B01F 23/232 366/184 |
| 2013/0000733 | A1 * | 1/2013 | Gothard | B01F 25/31241 137/101.11 |
| 2016/0354736 | A1 * | 12/2016 | Young | F04F 5/10 |
| 2021/0207047 | A1 * | 7/2021 | Taylor | C10K 1/026 |
| 2021/0402362 | A1 * | 12/2021 | Ingels | B01J 19/2465 |

OTHER PUBLICATIONS

Chen et al., "Some Psychometric Aspects of a Hydraulic Air Compressor (HAC)" The Journal of Energy Resources Technology, vol. 104, No. 3, Sep. 1, 1982, pp. 274-276.

R.G. Cunningham, "Gas compression with the liquid jet pump" Journal of Fluids Engineering, vol. 96, No. 3, Sep. 1, 1974, pp. 203-215.

Mazzei Injector Company, LLC, "Model 0584 Injector Performance Table", 2014, 12 pages.

Dean L. Millar, "A review of the case for modern-day adoption of hydraulic air compressors", Applied Thermal Engineering, vol. 69, Issues 1-2, Apr. 26, 2014, pp. 55-77.

Pavese et al., "Mechanical Efficiency of Hydraulic Air Compressors", Journal of Energy Resources Technology, vol. 138, No. 6, Jun. 27, 2016, 11 pages.

Warren Rice, "Performance of Hydraulic Gas Compressors", Journal of Fluids Engineering, vol. 98, No. 4, Dec. 1, 1976, pp. 645-652.

Justin Sivret, "Commissioning and Verification of Compressed Air Yield on the Hydraulic Air Compressor Demonstrator", Thesis, Laurentian University of Sudbury, 2018, 259 pages.

Winoto et al., "Efficiency of Jet Pumps", Journal of Hydraulic Engineering, vol. 126, Issue 2, Feb. 1, 2000, pp. 150-156.

Jan H. Witte, "Mixing shocks in two-phase flow", Journal of Fluid Mechanics, vol. 36, Issue 4, May 19, 1969, 639-655.

Young et al., "Gas absorption in a hydraulic air compressor. Part I: Simultaneous hydrodynamic and mass transfer bubbly flow model", Chemical Engineering Science, vol. 260, 117871, Oct. 12, 2022.

* cited by examiner

MEASURE TO IMPROVE LIQUID-GAS EDUCTOR PERFORMANCE

CROSS-REFERENCE TO RELATED APPLICATIONS

This application claims benefit of priority under 35 U.S.C. section 119(e) of the U.S. Provisional Patent Application Ser. No. 63/425,159, filed Nov. 14, 2022, entitled "Measure to Improve-Liquid-Gas Eductor Performance," which is hereby incorporated by reference in its entirety.

TECHNICAL FIELD

The present disclosure relates, generally, to a method for pumping and compressing a gas. More particularly, the present disclosure pertains to a method for pumping and compressing a gas by injecting a secondary gas into a motive liquid of an eductor to increase a suction and/compression of a gas and an eductor thereof.

BACKGROUND INFORMATION

Eductor uses venturi effect to pump or move a fluid, for example, a in an enclosed line using a motive fluid. However, introduction of a pressurized secondary gas inside the motive fluid of the eductor generally degrades the performance of the eductor and reduces the flow and compression of the fluid being pumped.

SUMMARY OF DISCLOSURE

An aspect of this disclosure relates to a method for pumping and compressing an inducted gas using an educor. The eductor eductor includes a ventruri structure having a throat, and an inlet conduit having a nozzle portion extending inside the venturi structure and located upstream of the throat. The method includes pumping a primary motive liquid inside the inlet conduit, and injecting compressed secondary gas inside the inlet conduit at a location upstream of the nozzle portion. The method also includes maintaining a flow rate of the secondary gas inside the inlet conduit within a predefined limit. A mixture of the primary motive liquid and the secondary gas enters the throat from the nozzle portion, and momentum of the primary motive liquid mixed with the secondary gas inside the throat creates a low-pressure inside the throat, facilitating a suction and compression of the inducted gas.

In some additional, alternative, or selectively cumulative embodiments, the method also includes maintaining an eductor back pressure within a predetermined limit.

In some additional, alternative, or selectively cumulative embodiments, the secondary gas is compressed to a pressure level corresponding to a pumping pressure of the primary motive liquid inside the inlet conduit.

One aspect of this disclosure relates to an eductor for pumping and compressing an inducted gas using a primary motive liquid. The eductor comprises a venturi structure having an inlet portion defining a suction chamber and adapted to fluidly connected to a source of the inducted gas. The venturi structure also includes a venturi portion connected to the inlet portion and having a throat arranged downstream of the inlet portion. The venturi portion includes a divergent nozzle connected to the throat and extending downstream of the throat. Moreover, the eductor includes an inlet conduit to facilitate a flow of the primary motive liquid to the throat and having a nozzle portion arranged inside the venturi structure and having an outlet arranged proximate to and outside of an inlet opening of the throat. Further, the eductor includes a gas conduit connected to the inlet conduit and upstream of the nozzle portion to inject a secondary gas into the primary motive liquid. Momentum of the primary motive liquid mixed with the secondary gas inside the throat creates a low-pressure inside the throat, facilitating a suction and compression of the inducted gas.

In some additional, alternative, or selectively cumulative embodiments, the venturi portion includes a convergent nozzle having one end connected to the inlet portion defining an inlet end of the venturi portion therebetween, and another end connected to the throat.

In some additional, alternative, or selectively cumulative embodiments, the nozzle portion of the inlet conduit is arranged, at least partially, inside the convergent nozzle and is coaxial to the convergent nozzle.

In some additional, alternative, or selectively cumulative embodiments, the eductor is one of an injector, ejector, aspirator, venturi injector, liquid jet gas compressor, liquid-gas ejector pump, liquid-gas jet pump, or liquid-gas contactor.

Additional aspects and advantages will be apparent from the following detailed description of example embodiments, which proceeds with reference to the accompanying drawings.

DETAILED DESCRIPTION

Figure 1:
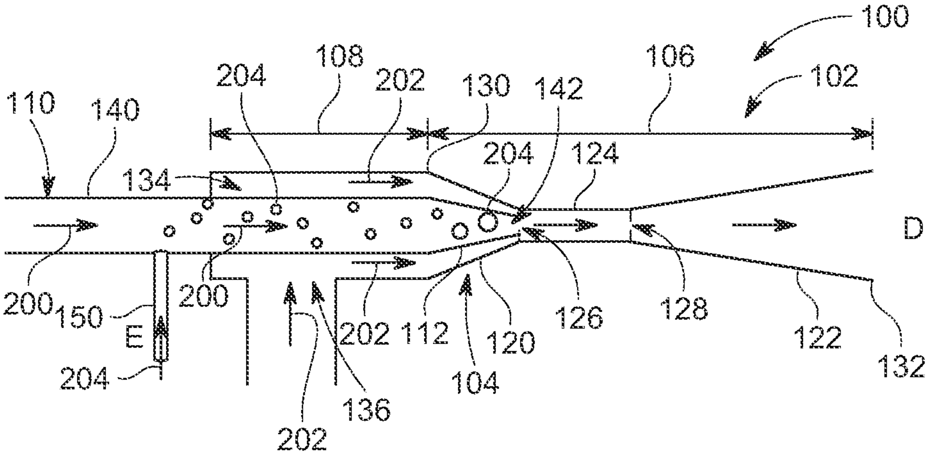
FIG. 1 illustrates a schematic view of an eductor, in accordance with an embodiment of the disclosure.

Example embodiments are described below with reference to the accompanying drawings. Unless otherwise expressly stated in the drawings, the sizes, positions, etc., of components, features, elements, etc., as well as any distances therebetween, are not necessarily to scale, and may be disproportionate and/or exaggerated for clarity.

The terminology used herein is for the purpose of describing particular example embodiments only and is not intended to be limiting. As used herein, the singular forms "a," "an" and "the" are intended to include the plural forms as well, unless the context clearly indicates otherwise. It should be recognized that the terms "comprise," "comprises," and/or "comprising," when used in this specification, specify the presence of stated features, integers, steps, operations, elements, and/or components, but do not preclude the presence or addition of one or more other features, integers, steps, operations, elements, components, and/or groups thereof. Unless otherwise specified, a range of values, when recited, includes both the upper and lower limits of the range, as well as any sub-ranges therebetween. Unless indicated otherwise, terms such as "first," "second," etc., are only used to distinguish one element from another. For example, one element could be termed a "first element" and similarly, another element could be termed a "second element," or vice versa. The section headings used herein are for organizational purposes only and are not to be construed as limiting the subject matter described.

Unless indicated otherwise, the terms "about," "thereabout," "substantially," etc. mean that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art.

Spatially relative terms, such as "right," left," "below," "beneath," "lower," "above," and "upper," and the like, may be used herein for ease of description to describe one element's or feature's relationship to another element or feature, as illustrated in the drawings. It should be recognized that the spatially relative terms are intended to encompass different orientations in addition to the orientation depicted in the figures. For example, if an object in the figures is turned over, elements described as "below" or "beneath" other elements or features would then be oriented "above" the other elements or features. Thus, the term "below" can, for example, encompass both an orientation of above and below. An object may be otherwise oriented (e.g., rotated 90 degrees or at other orientations) and the spatially relative descriptors used herein may be interpreted accordingly.

Unless clearly indicated otherwise, all connections and all operative connections may be direct or indirect. Similarly, unless clearly indicated otherwise, all connections and all operative connections may be rigid or non-rigid.

Like numbers refer to like elements throughout. Thus, the same or similar numbers may be described with reference to other drawings even if they are neither mentioned nor described in the corresponding drawing. Also, even elements that are not denoted by reference numbers may be described with reference to other drawings.

Many different forms and embodiments are possible without deviating from the spirit and teachings of this disclosure and so this disclosure should not be construed as limited to the example embodiments set forth herein. Rather, these example embodiments are provided so that this disclosure will be thorough and complete, and will convey the scope of the disclosure to those skilled in the art.

Reference in this specification to "one embodiment" or "an embodiment" means that a particular feature, structure, or characteristic described in connection with the embodiment is included in at least one embodiment of the present disclosure. The appearance of the phrase "in one embodiment" in various places in the specification are not necessarily all referring to the same embodiment, nor are separate or alternative embodiments mutually exclusive of other embodiments.

Referring to FIG. 1, an eductor 100, for example, a liquid gas eductor 102, that uses a non-compressible liquid, for example, water, as a primary motive liquid 200, to pump a gas 202 (hereinafter referred to as inducted gas 202), for example air, that is inducted or sucked inside the eductor 100 due to a low pressure region created by a motive fluid inside the eductor 102. As shown, the eductor 100 includes a venturi structure 104 having a venturi portion 106 and an inlet portion 108 connected to the venturi portion 106, and an inlet conduit 110 having an inlet nozzle 112 extending inside the venturing structure 104 to deliver the motive fluid inside the venturi portion 106.

As shown, the venturi portion 106 includes a convergent nozzle 120 connected to the inlet portion 108 receives the inducted gas 202 from the inlet portion 108, and a divergent nozzle 122 to enable an outlet of a mixed fluid from the eductor 100, Further, the venturi portion 106 includes a throat 124 connecting the convergent nozzle 120 to the divergent nozzle 122 and extending from the convergent nozzle 120 to the divergent nozzle 122. A cross-sectional area of the throat 124 remains constant throughout its length and includes an inlet opening 126 at a junction of the throat 124 with the convergent nozzle 120 and an outlet opening 128 at an intersection of the divergent nozzle 122 and the throat 124. Also, as can be seen, a cross-sectional area of the convergent nozzle 120 decreases from an inlet end 130 of the venturi portion 106 to the throat 124, while a cross-sectional area of the divergent nozzle 122 increases from the outlet opening 128 of the throat 124 to an outlet end 132 of the divergent nozzle 122. Accordingly, a velocity of fluid flowing through the convergent nozzle 120 increases while a pressure of the fluid decreases as the fluid flows from the inlet end 130 to the inlet opening 126 of the throat 124. Similarly, the velocity of the fluid flowing through the divergent nozzle 122 decreases while the pressure of the fluid increases as the fluid flows from the outlet opening 128 of the throat 124 to the outlet end 132 of the venturi portion 106. Moreover, a transfer of momentum takes place inside the throat 124 between the motive primary liquid 200 and the inducted gas 202, creating a mixture of the motive primary liquid 200 and the inducted gas 202 that flows through the divergent nozzle 122.

Further, inlet portion 108 is connected to the inlet end 130 of the venturi portion 106 and defines a suction chamber 134 into which the inducted gas 202 is sucked/inducted due to the low pressure region created inside the throat 124. As shown, the inlet portion 108 includes a suction port 136 that is fluidly connected to a reservoir of the inducted gas 202 to enable the flow of the inducted gas 202 inside the suction chamber 134 from the reservoir. The inducted gas 202 flows through inside the venturi portion 106 through the inlet end 130 from the suction chamber 134 and enters the throat 124 via the inlet opening 126.

Also, as shown in FIG. 1, the inlet conduit 110 extends through the suction chamber 134 with the nozzle portion 112 arranged at least partially arranged inside the convergent nozzle 120 of the venturi portion 106. As shown, the nozzle portion 112 is disposed/arranged substantially coaxially to the convergent nozzle 120, and the inlet conduit 110 further includes a tube portion 140 extending through the inlet portion 108 from the nozzle portion 112 to a location outwardly of the venturi structure 104 and is fluidly connected with a source of the primary motive liquid 200, for example, a pump. The tube portion 140 is arranged to receive primary motive liquid 200 at a desired/predetermined velocity from the fluid source, for example, the pump, or a pressurized reservoir, and facilitates a flow of the primary motive liquid 200 to the nozzle portion 112 from the fluid source. The nozzle portion 112 defines a converging nozzle with a cross-section of the nozzle portion 112 decreasing from the tube portion 140 to an outlet 142 of the nozzle portion 112 (i.e., inlet conduit 110). In the illustrated embodiment, the nozzle portion 112 is arranged such that the outlet 142 of the nozzle portion 112 is disposed proximate to the inlet opening 126 of the throat 124 of the venturi portion 106. Accordingly, a fluid leaving the nozzle portion 112 may directly enters the throat 124 of the venturi portion 104, and mixes with the inducted gas 202 inside the throat 124. However, in some embodiments, the fluid exiting the nozzle portion 112 may enter the convergent nozzle 120 and is slightly mixed with the inducted gas 202 before entering the throat 124.

Moreover, the eductor 100 includes a gas conduit 150 connected to the tube portion 140 at a location upstream of the nozzle portion 112 and configured to facilitate a flow of a secondary gas 204, for example, injected gas 204, inside the tube portion 140. In the illustrated embodiment, the gas conduit 150 is connected to the tube portion 140 at a location arranged outwardly upstream of the inlet portion 106 of the venturi structure 104. It may be appreciated that the injected gas 204 is a compressed gas, for example, compressed air, pressurize such that a pressure of the injected gas 204 is substantially equal to the pressure of the primary motive liquid 200 flowing through the tube portion 140. Accordingly, the pressure of the injected gas 204 may be substantially equal to a delivery pressure of the primary motive fluid source, for example, pump. Moreover, to pressurize the injected gas 204 to a desired pressure, a compressor may be utilized.

As the injected gas 204 enters the tube portion 140, the injected gas 204 occupies a portion of the volume of the tube portion 102. Since the primary motive liquid is an incompressible liquid and the injected gas 204 is hard to compress as the pressure of the injected gas 204 is substantially equal to the pressure of the primary motive liquid 200 flowing inside the tube portion 140, the introduction of the injected gas 202 reduces the volume of the tube portion 140 occupied by the primary motive liquid 200, thereby decreasing a cross-sectional area of the tube portion 140 available for the primary motive liquid 200 to flow. Accordingly, a velocity of the primary motive liquid 200 and hence the motive fluid (i.e., mixture of primary motive liquid 200 and injected gas 204) increases downstream of the junction of the tube portion 140 with the gas conduit 150 relative to a scenario when no secondary gas 204 is injected inside the tube portion 140.

Moreover, as the mixture of the primary motive liquid 200 and the injected gas 204 flows through the nozzle portion 112, a velocity of the mixture increases, causing a reduction of the pressure inside the nozzle portion 112. Due to the reduction of pressure inside the nozzle portion 112, the injected gas 204 expands, and bubbles of the injected gas 204 may be formed inside the nozzle portion 112, causing a further reduction in the cross-section area available for the primary motive fluid 200 to flow. This results in an additional increase in the velocity of the motive fluid leaving the nozzle portion 112, and hence increased momentum of the motive fluid entering the throat 124. The higher momentum of the mixture, specifically that of the primary motive fluid 200, entering the throat 124 relative to the momentum of the primary motive fluid 200 without injected gas 204, creates a relatively lower pressure inside the throat 124, resulting into increased flow rate of the inducted gas 202 inside the throat 124. Moreover, inside the throat 124, a momentum exchange takes place between the primary motive fluid 200 and the induced gas 202, resulting in an increase in the momentum of the inducted gas 202, and hence the compression of the inducted gas 202. As the momentum of the motive fluid entering the throat 124 when there is an addition of the injected gas 204 inside the primary motive fluid 200 is relatively more than the momentum of the motive fluid when there is no injected air, a relatively increased compression of inducted gas 202 happened inside the throat when there is the addition of the injected air 204.

However, it may be appreciated that the amount of injected gas 204 i.e., volume per liter of the injected gas 204, need to be maintained within a predefined limit to prevent an expansion of the injected gas 204 inside the nozzle portion 112 to such an extent that the injected gas 204 reduces a flow of the primary motive liquid 200 to the venturi portion 106 and causes a significant reduction in flow rate of the inducted gas 202.

Moreover, the flow rate of the inducted gas 204 entering the throat 124 also depends on the back pressure of the eductor 100, specifically when there is an addition of the injected gas 204. At zero or low back pressure, the flow rate of the induced gas 202 entering the throat 124 (i.e., the venturi structure 104) decreases upon addition of even the small amount of the injected gas 204 inside the tube portion 140. Also, during the normal operation, as the eductor back pressure rises to the primary motive liquid delivery pressure i.e., pressure at which the primary motive liquid 200 is provided by the pump, there is no appreciable change in the flow rate of the inducted gas 202 when small amount of injected gas 202 is added to the primary motive liquid 200. Also, eductor back pressure needs to be maintained with a predefined/predetermined limit to increase the suction and compression of the inducted gas 202 due to the addition of the injected gas 203 upstream of the nozzle portion 112 of the eductor 100.

Figure 2:
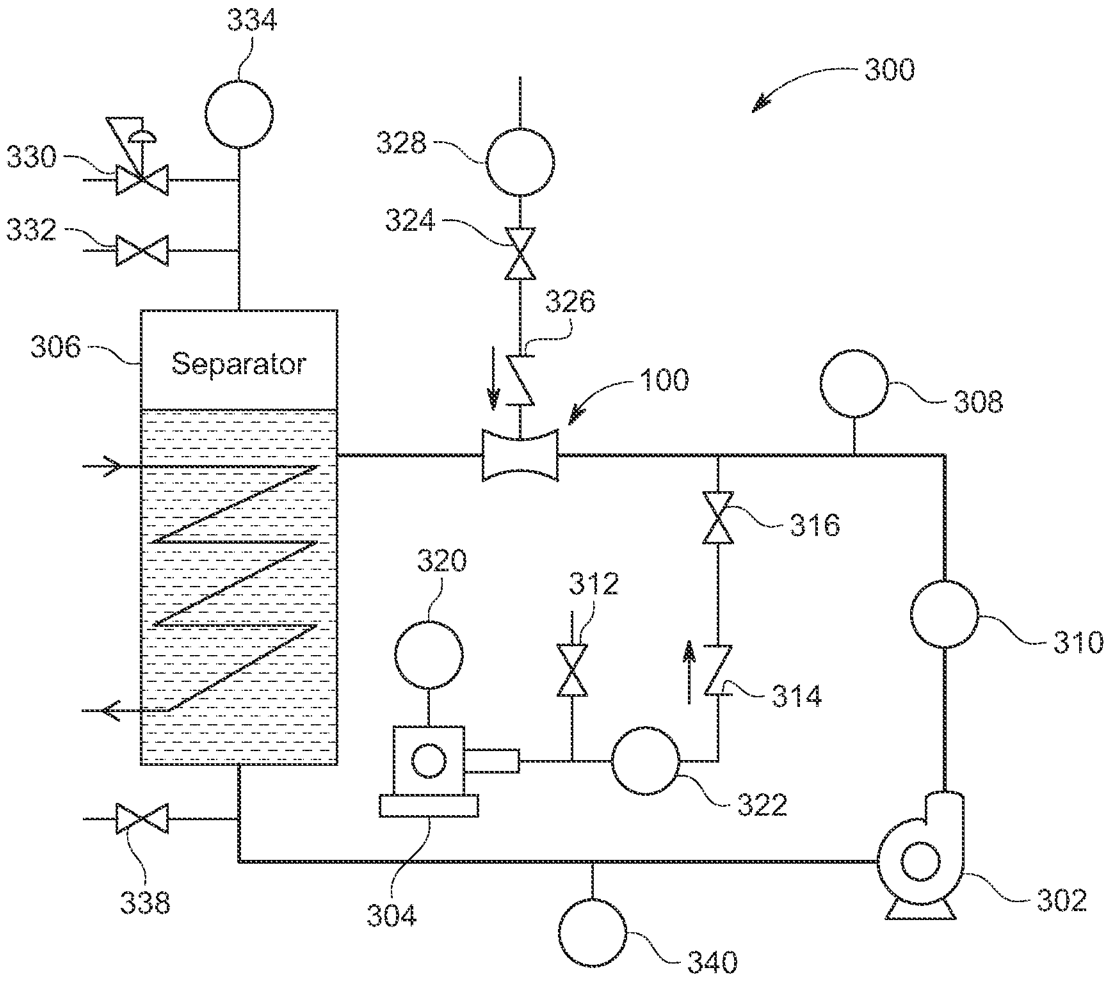
FIG. 2 illustrates a schematic view of a test apparatus used to determine a performance of the eductor, in accordance with an embodiment of the disclosure.

Referring to FIG. 2, a schematic view of an exemplary test apparatus 300 for determining an effect of injecting a secondary gas inside a primary motive fluid for pumping and compressing of an inducted gas is shown. For testing, the water is used as the primary motive fluid, while the air is used as the inducted gas as well as inducted gas. As shown, the apparatus 300 includes a pump 302 connected to the eductor 100 for providing pressurized water to the eductor 100 and an auxiliary compressor 304 for injecting compressed air (injected air) into the eductor upstream of the nozzle portion. To control and maintain the eductor back pressure the apparatus 300 further includes a separator 306 arranged downstream of the eductor 100 and connected to the eductor 100 to receive the mixture of air and water from the eductor 100.

To measure a pressure and a flow rate of the water entering the eductor, the apparatus 300 further includes a first gauge pressure indicator 308 and a first volumetric flow indicator 310 arranged between the eductor and the pump 304 and upstream of the injection point of the injected air inside the water. Moreover, the test apparatus 300 further includes an injected air bypass valve 312 for discharging the compressed air from the compressor 304 to atmosphere to decrease an injection of compressed air inside the water. Further, by opening and closing an injected air isolation valve 316, the injection of the injected air inside the water from the compressor 304. The test apparatus 300 also includes a non-return valve 314 between the compressor 304 and the injected air isolation valve 314 to restrict/prevent a back flow of the compressed air to the compressor 304. Moreover, the apparatus 300 includes a second gauge pressure indicator 320 to measure the pressure of the compressed air and a first digital mass flow meter 322 to measure a flow rate of the compressed air being injected inside the water.

Additionally, to facilitate/control a suction and flow of the inducted air inside the venturi structure of the eductor 100, the apparatus 300 includes an inducted air isolation valve 324, a non-return valve 326. A second mass flow meter 328 to measure flow rate of inducted air inside the eductor 100.

To control the flow parameters (for example, separator pressure, separator delivery pressure, and eductor back pressure), the apparatus 300 further includes a high precision adjustable pressure relief valve 330 and a compressed air isolation valve 332, and a gauge pressure indicator 334. The water is injected inside the circuit via a valve 338 and the lab room temperature is recorded by a lab room temperature indicator 340 arranged between the pump 302 and the separator 306. Initially, the valve 338 and the compressed air isolation valve 332 is opened and the water is allowed to flow inside the separator 306 via the pump 302. The water is allowed to flow inside the separator 306 until the water level inside the separator 306 is above the level at which the eductor outlet is connected to the separator 306.

Upon filling of the water inside the separator 306 to a predetermined level, the valve 338 and the compressed air isolation valve 332 is closed and the high precision adjustable pressure relief valve 330 is opened to enable the water supply inside the cooling loop contained within the separator 306. The pump 302 is turned on to circulate the water inside the circuit. Thereafter, the high pressure adjustable relief value 330 in the valve is set to 15 psi and the rig is turned on until the water temperature was steady (i.e., approximately matched lab room temperature). Thereafter, the water flow rate to the cooling loop was adjusted to regulate the temperature at around 21° C., and when the temperature reached this condition, the apparatus 300 is warmed up and is ready for experimental observations.

Once the apparatus 300 is ready to take experimental observations, the apparatus 300 is taken through a series of set points by adjusting the high pressure relief valve 330 to vary the eductor discharge pressure systematically. The changes in the high pressure relief valve 330 is assessed on the pressure indicators 308 and flow meters 310, 328 for few seconds duration. Thereafter, the compressor 304 is also changed to different state (for example, OFF to ON or ON to OFF) to create new additional set pints, which examined the effect of injected gas on the performance of the eductor 100. When the compressor 304 is OFF, the injected air isolation valve 324 is closed and when the compressor 304 is ON, the injected air isolation valve 324 is open. After the experimental run, the instruments readings are obtained from the video recording and sampling the indicator every 10 seconds after the start of the set points.

Figure 3:
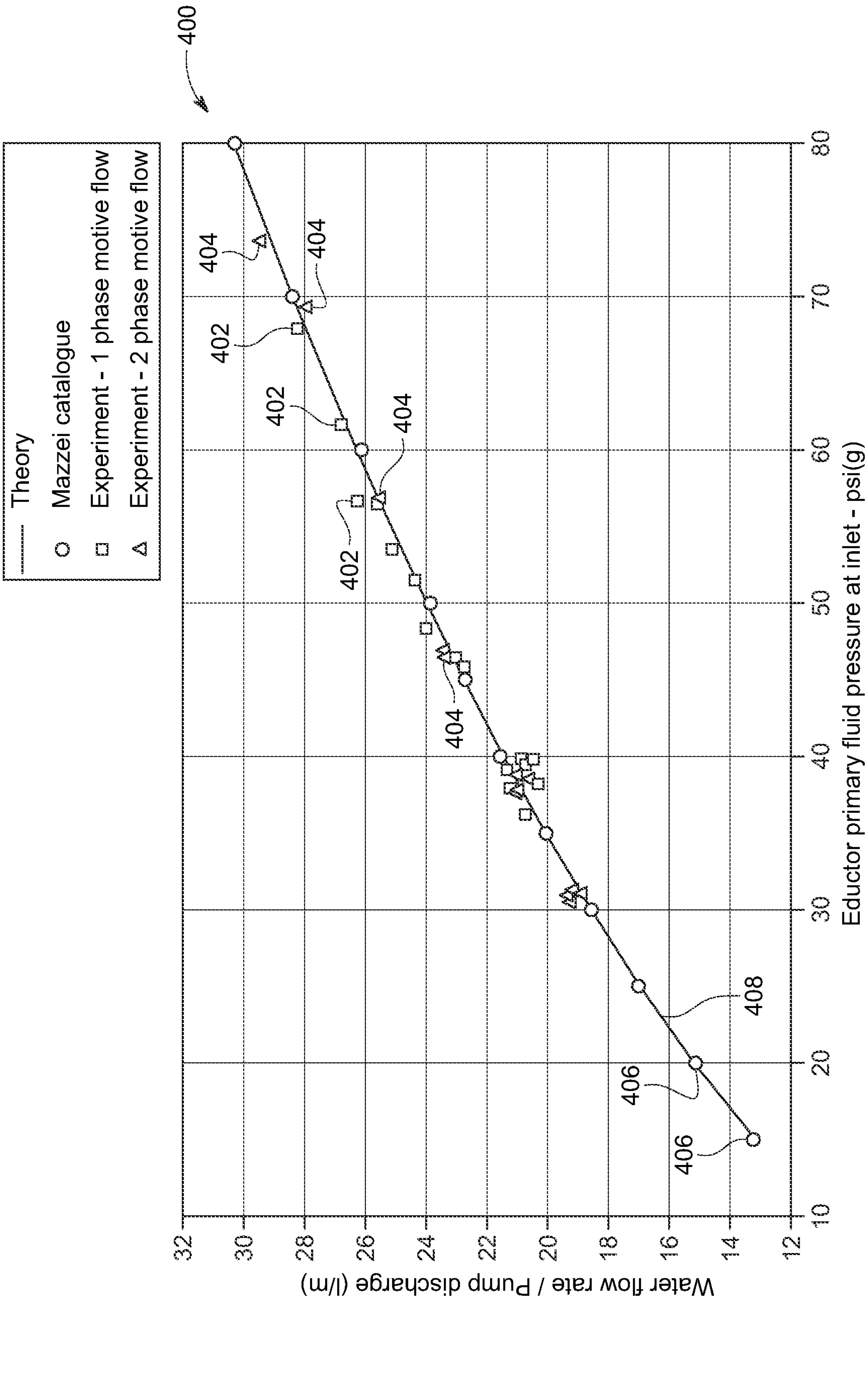
FIG. 3 illustrates a graph depicting experimental data of the water flow rate vis a vis eductor primary fluid pressure at inlet, obtained using the test apparatus; in accordance with an embodiment of the disclosure.

Referring to FIG. 3, a graph 400 a graph depicting experimental data of the water flow rate vis a vis eductor primary fluid pressure at inlet, obtained using the test apparatus 300. The set points are grouped into two groups, i.e., one group of set points 402 obtained without the injected air and other group of set points 404 obtained with injected air. On the same axes, the Mazzei eductor performance table data 406 for the eductor nozzle and the theoretical curve using the Bernoulli equation 408 with an atmospheric secondary suction pressure is plotted. As shown, the theoretical curve 408 and the Mazzei performance data 404 agreed almost exactly. The experimental observations required a 1 psi(g) reduction from the gauge pressure indicator 308 value in order to fit with both the theoretical curve and Mazzei published data. This 1 psi(g) differential is attributed to fittings and major and minor losses between the position of gauge pressure indicator 308 and the inlet to eductor/eductor valve.

Figure 4:
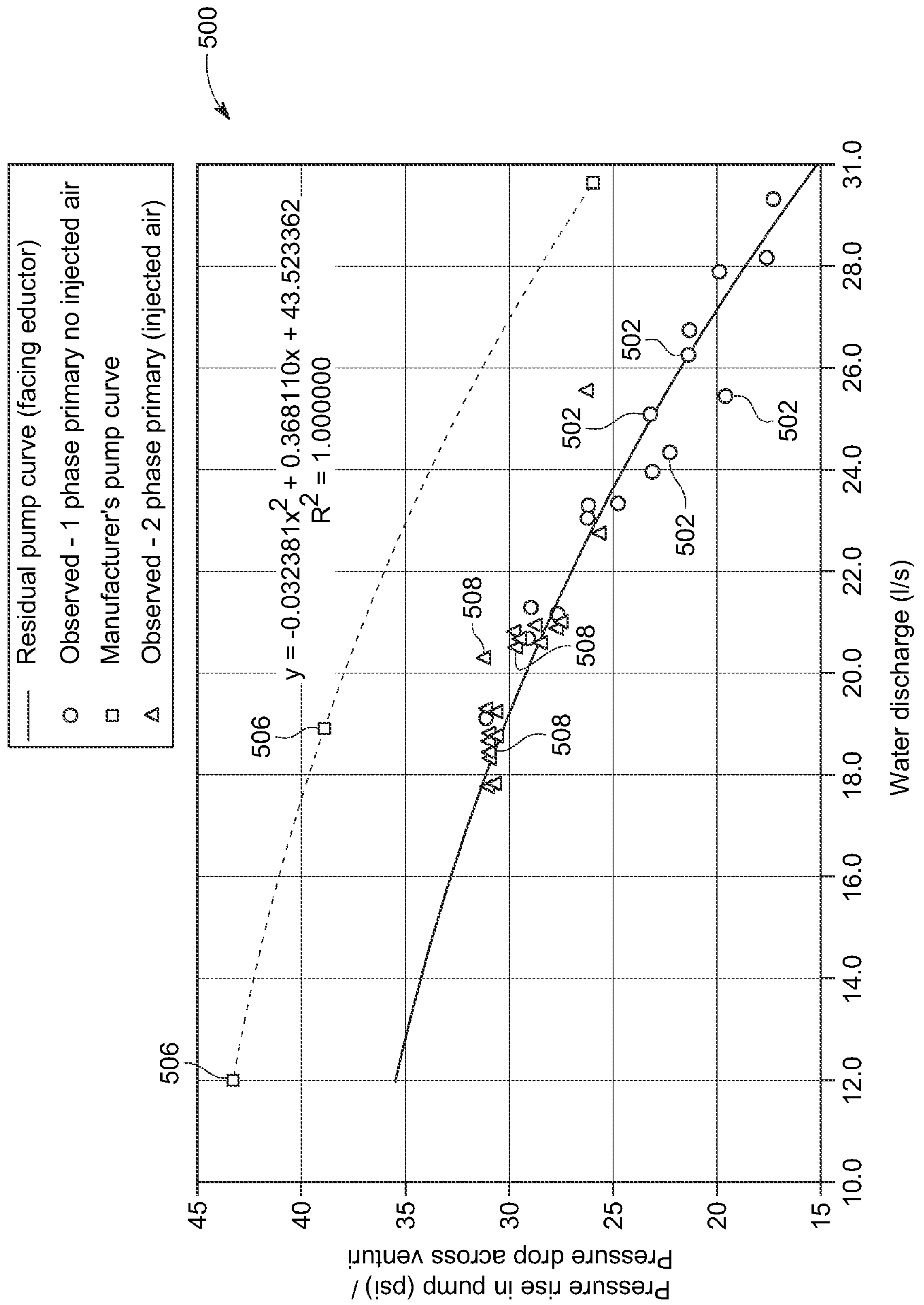
FIG. 4 illustrates a graph depicting experimental data of pressure drop across eductor vis a vis measured water flow rate at inlet of eductor, obtained using the test apparatus; in accordance with an embodiment of the disclosure.

Referring to FIG. 4, a graph 500 between is plotted based on the results obtained using the apparatus 300. On the same axes, the pressure drop obtained across the injector measured using the gauge pressure indicator 308, 334 and measured flow rate measured using water volumetric flow indicator 310 is plotted for set points with no injected air 502. The experimental data 502 followed the form of the manufacture pump curve 506, but is offset (approximately 7.4 psi (g)) below it. As shown in the curve, the velocities of water in the separator 306 are much lower than in other parts of the circuit, the 7.4 psi(g) offset amount was attributed to losses in the separator 306. The losses of quadratic form were attributed to remaining piping, tubes, bends and fittings of the circulation rig. Data from the set points 508 with injected air from the auxiliary compressor 304 are also shown in FIG. 4. These points are also in fairly good agreement with the residual pump curve determined with the single phase primary liquid set points alone.

Figure 5:
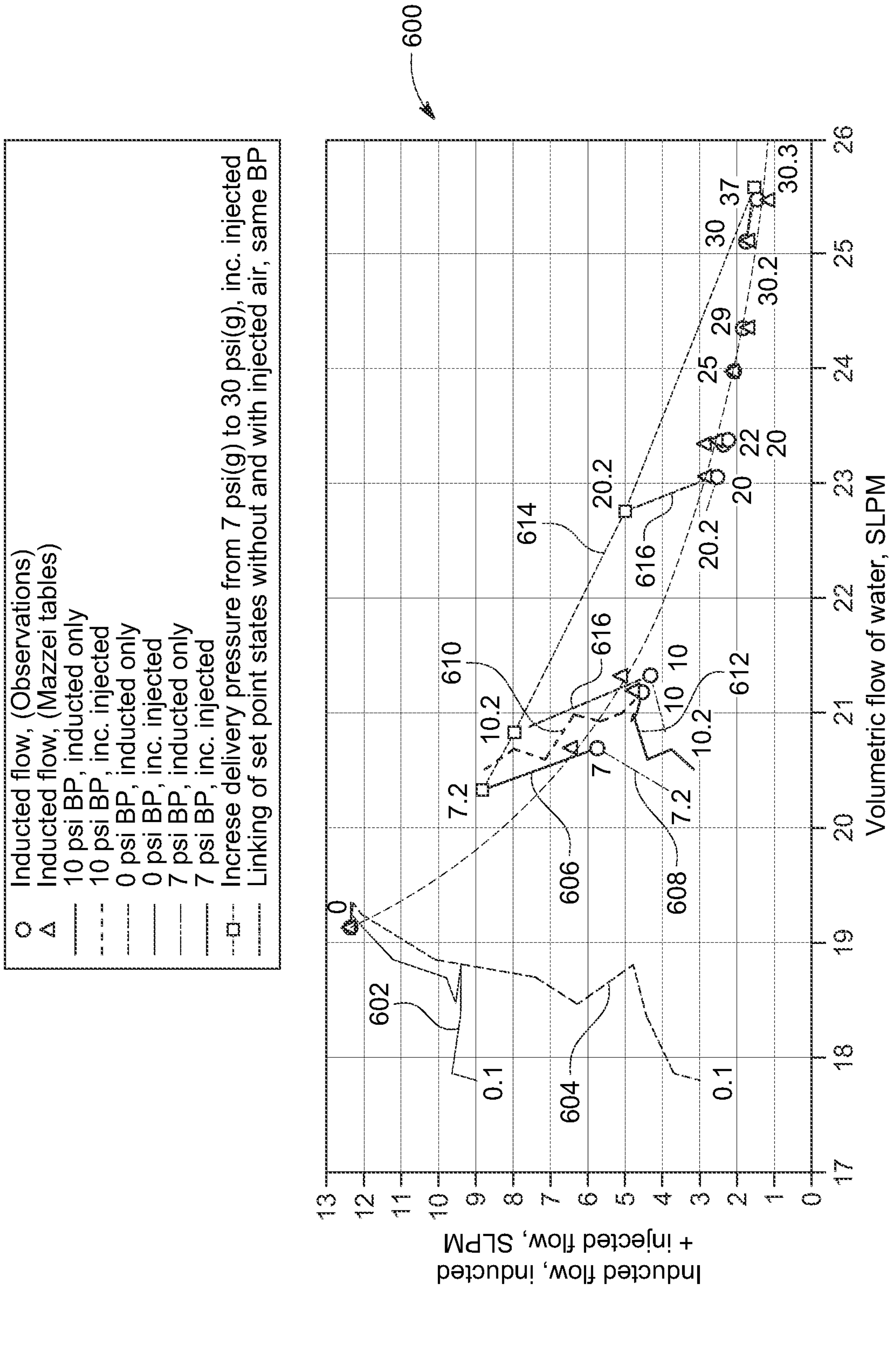
FIG. 5 illustrates a chart depicting the experimental data obtained for the eductor, in accordance with an embodiment of the disclosure.

Referring to FIG. 5, a chart 600 depicts an experimental data of an experiment performed using the eductor 100 in the apparatus 300. The chart 600 is prepared between the combined volume flow rate of the induced gas 202 and injected gas 204 versus the volume flow rate of the primary motive fluid 200 with air being used as both the injected gas 204 and the inducted gas 202 and the primary motive fluid 200 as water. In chart 600, the lines 602, 604, 606, 608, 610, 612 that are without points relay loci of operating state trajectories created as sequences of set points with constant eductor back-pressure. For example, line 602 depicts the loci of the operating state trajectory created with the eductor back pressure set at 0 psi and with injected gas 204 introduced inside the tube portion 140. Line 604 depicts the loci of the operating state trajectory created with the eductor back pressure set at 0 psi and without injected gas 204 introduced inside the tube portion 140. Line 606 depicts the loci of the operating state trajectory created with the eductor back pressure set at 7 psi and with injected gas 204 introduced inside the tube portion 140. Line 608 depicts the loci of the operating state trajectory created with the eductor back pressure set at 7 psi and without injected gas 204 being introduced inside the tube portion 140. Line 610 depicts the loci of the operating state trajectory created with the eductor back pressure set at 10 psi and with injected gas 204 being introduced inside the tube portion 140. Line 612 depicts the loci of the operating state trajectory created with the eductor back pressure set at 10 psi and without the injected gas 204 being introduced inside the tube portion 140. Line 614 shows an operating trajectory where the eductor backpressure started at 7.2 psi and then was progressively increased to 37 psi keeping with the injected gas 204 being added inside the tube portion. Lines 616 links the state points without and with injected air at same eductor back pressure level.

From the chart 600, it can be seen that the volume flow rate of water, combined volume flow rate of the injected gas and inducted gas, and volume flow rate of the inducted gas decrease when the injected gas is added into the primary motive fluid at zero or very low back pressure relative to a scenario when there is no addition of the injected gas.

Also, it can be seen from the chart 600 that introduction of injected air at high back pressure the combined volume flow rate of the injected air and the induced air reduces to below the level for inducted air alone when there is no addition of the injected air.

Further, it can be seen from the chart 600 that at intermediate eductor back pressure levels when air was injected just before the eductor inlet at the eductor primary inlet pressure, the performance of the eductor in aggregate throughput of air and its compression is enhanced, relative to the induced air only condition. For example, at a back pressure of 10 psi with the flow rate of inducted air is ~4 SLPM and the flow rate of injected air is also 4 SLPM for an aggregate air flow of 8 SLPM. In comparison to the scenario with no injected air and a back pressure of 10 psi, the flow rate of inducted air reduced is 4.0 SLPM. Although there is a penalty on induced air flow rate when the air is injected inside the water, this is more than compensated for by the volume of injected air that is compressed alongside the inducted air inside the throat 124. In the case of the back pressure of 20 psi, the inducted air flow rate increases a little from 2.5 to 2.8 SLPM, in comparison to the no addition of the injected air.

Also, for same back pressure of the eductor 100, introduction of the injected air (i.e., injected gas) improves eductor performance in terms of gas throughput and overall eductor compression efficiency The eductor efficiency can be calculated using the following equation.

$$\eta_{eductor} = \frac{\dot{W}_{iso}}{\dot{W}_{aux} + \dot{W}_{pump}} = \frac{-RT\ln\left(\frac{P_s}{P_d}\right)\cdot(\dot{m}_{a,inducted} + \dot{m}_{a,injected})}{C_{p,air}T_{lab}\left(\left(\frac{P_d}{P_s}\right)^{\frac{k-1}{k}} - 1\right)\cdot\dot{m}_{a,injected} + \rho_w g H \dot{V}_w}$$

$\dot{W}_{aux}$, is the adiabatic pneumatic power provided by the compressor, and $\dot{W}_{pump}$ ignores the efficiency of its driving motor and impellor. $C_{p,air}$, $T_{lab}$ and k are the heat capacity at constant pressure, the lab (air intake) pressure and the ratio of specific heats respectively. Further, the overall efficiency of the apparatus 300 by taking into account work done by compressor and pump and associated efficiencies can be estimated as by the following equation.

$$\eta_{overall} = \frac{\dot{W}_{iso}}{\frac{\dot{W}_{aux}}{\eta_{comp}} + \frac{\dot{W}_{pump}}{\eta_{pump}}}$$

For the above-mentioned experimental condition, at 20 psi back pressure, the gas throughput is almost doubled, and eductor efficiency is nearly doubled. Moreover, at 30 psi back pressure, the efficiency of the eductor reduces slightly when there is an introduction of the air as compared to a scenario when there is no introduction of injected air. Similarly, at 0 psi or very low back pressure, the efficiency of the eductor reduces when there is an introduction of the air as compared to a scenario when there is no introduction of injected air.

Many modifications and other embodiments of the disclosures set forth herein will come to mind to one skilled in the art to which these disclosures pertain having the benefit of the teachings presented in the foregoing descriptions and the associated drawings. Therefore, it is to be understood that the disclosures are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims.

What is claimed is:

1. A method to improve the performance of an eductor, which is used as an appliance to mix an inducted gas with a primary motive liquid, the method comprising:

providing an eductor comprising:

a venturi structure with a venturi portion and an inlet portion, the inlet portion comprising a suction port for the flow of an inducted gas;

an inlet conduit with a nozzle portion extending inside the venturi structure, a gas conduit connected to the inlet conduit upstream of the inlet nozzle;

a throat, wherein a cross-sectional area of the throat remains constant throughout its length and includes an inlet opening at a junction of the throat with a convergent nozzle, and an outlet opening at an intersection of a divergent nozzle and the throat, an outlet of the nozzle portion is disposed proximate the inlet opening of the throat so fluid leaving the nozzle portion directly enters the throat;

injecting an amount of compressed secondary gas through the gas conduit connected to the inlet conduit upstream of the inlet nozzle into the primary motive liquid prior to an entry of the primary motive liquid into the eductor at specific eductor delivery pressures.

2. The method of claim 1, wherein injection of the compressed secondary gas increases the overall throughput of the secondary gas in the eductor when the secondary gas and primary motive liquid is delivered at an educator outlet pressure equal to an eductor outlet pressure when only primary motive liquid is delivered.

3. The method of claim 1, wherein injection of the compressed secondary gas reduces the throughput of primary motive liquid when the compressed secondary gas and primary motive liquid is delivered at an educator outlet pressure equal to an eductor outlet pressure when only primary motive liquid is delivered.

4. The method of claim 1, wherein injection of the compressed secondary gas increases the mass flow and volume flow ratios of the gas flow rate to the primary motive flow rate when the secondary gas and primary motive liquid is delivered at an educator outlet pressure equal to an eductor outlet pressure when only primary motive liquid is delivered.

5. The method of claim 1, wherein injection of the compressed secondary gas increases the cumulative gas flow rate of the secondary gas with only an increase of energy consumed to produce the aggregate flow, such that the energy efficiency of delivering the aggregate flow to the eductor back-pressure is improved when the secondary gas and primary motive liquid is delivered at an educator outlet pressure equal to an eductor outlet pressure when only primary motive liquid is delivered.

6. The method of claim 1, wherein the eductor is one of an injector, an ejector, an aspirator, a venturi injector, a liquid jet gas compressor, a liquid-gas ejector pump, a liquid-gas jet pumps, or a liquid-gas contactors.

* * * * *